United States Patent [19]
Liu

[11] 3,819,218
[45] June 25, 1974

[54] ENERGY ABSORBING SAFETY BUMPER

[76] Inventor: Chang P. Liu, 6036 Scotmist Dr., Palos Verdes Peninsula, Calif. 90274

[22] Filed: Oct. 3, 1972

[21] Appl. No.: 294,518

Related U.S. Application Data

[63] Continuation-in-part of Ser. No. 137,245, April 26, 1971, abandoned.

[52] U.S. Cl. .................... 293/70, 293/89, 188/1 C
[51] Int. Cl. ........................... B60r 19/06, F16f 7/12
[58] Field of Search ............. 293/DIG. 3, 86, 70, 1, 293/89; 213/1 A; 188/1 C

[56] References Cited
UNITED STATES PATENTS
2,933,127   4/1960   Brewster ........................... 188/1 C
3,694,019   9/1972   Carter ............................... 188/1 C
3,705,740   12/1972  Shiomi et al. ...................... 188/1 C FOREIGN PATENTS OR APPLICATIONS
472,071    3/1951   Canada ............................. 188/1 C Primary Examiner—M. Henson Wood, Jr.
Assistant Examiner—Robert Saifer
Attorney, Agent, or Firm—John Holtrichter, Jr.

[57] ABSTRACT

A kinetic energy absorbing safety structure including at least one adjustable and replaceable elongated energy-absorbing element, the element being disposed in the structure to absorb kinetic energy only by elongating plastically under a simple uniaxial tension load, the tension load being exerted on the element when a compressive force is applied to an impact portion of the structure.

2 Claims, 10 Drawing Figures

PATENTED JUN 25 1974  3,819,218

Chang P. Liu,
INVENTOR.

BY.

ATTORNEY.

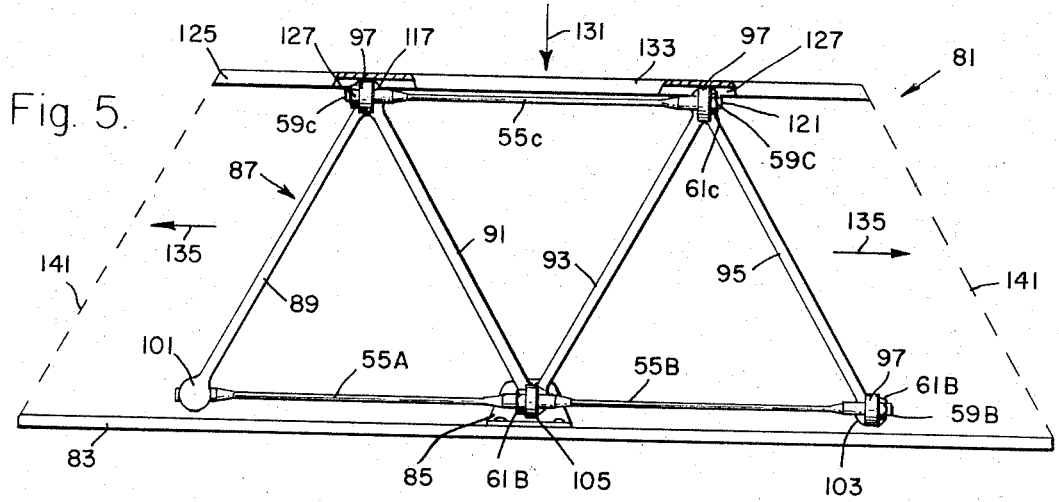
Fig. 5.
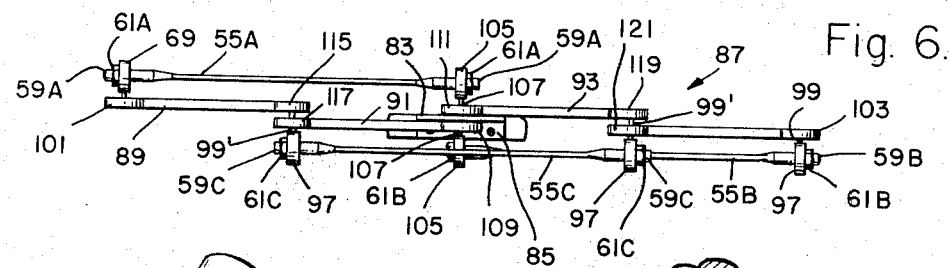
Fig. 6.
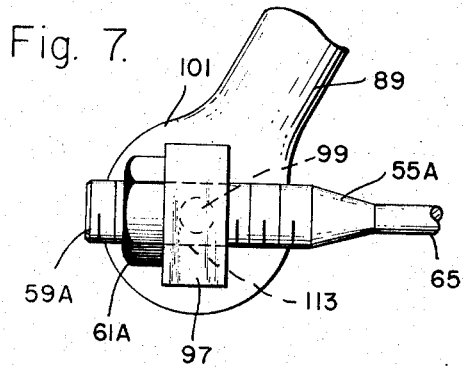
Fig. 7.
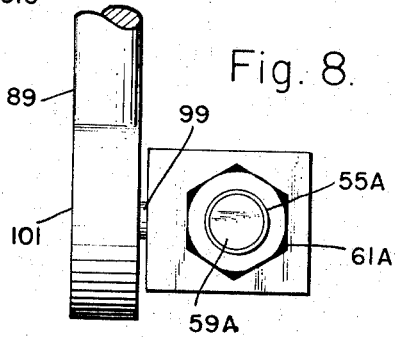
Fig. 8.
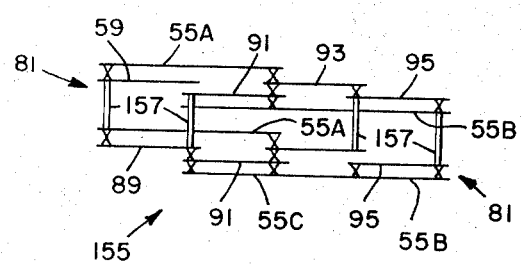
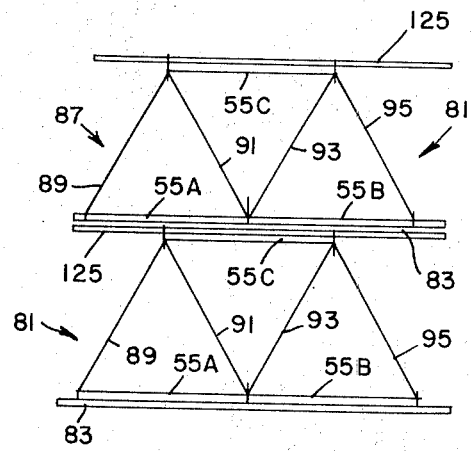
Fig. 9.
Fig. 10.

3,819,218

ENERGY ABSORBING SAFETY BUMPER

This is a continuation-in-part application of pending application Ser. No. 137,245 filed Apr. 26, 1971 now abandoned.

BACKGROUND OF THE INVENTION

The background of the invention will be set forth in two parts.

FIELD OF THE INVENTION

The present invention pertains to the field of safety devices and more particularly to bumpers used on vehicles and adjacent roadways to absorb impact energy and lessen or prevent damage to a vehicle coming into contact therewith, and to the body or vehicle carrying such a device.

DESCRIPTION OF THE PRIOR ART

Many different types of devices for protecting against impact damage have been used over the years. A major portion of these incorporate a resilient member or members which deform under a compressive impact force. A coil or leaf spring has been very popular of this application but has the decided disadvantage of providing a rebound force which can be as destructive and damaging as the original impact force.

Another type of compressive force absorbing technique utilizes a system of deformable members which collapse under a compressive load. The disadvantage found here is that it is difficult to provide a device which will deform in a uniform manner and in a linear fashion so that the impact force is not transmitted directly to the body to be protected. Even a scheme whereby a movable member which bends in a curved guide under impact has this disadvantage.

Still another type of compressive force absorber is one wherein shearing heads are moved under a compressive force so that one or more shearable pins are cut by the heads. Again, at least some of the impact force is transmitted to the body.

There has developed in the railroad field a fairly effective technique to absorb impact forces caused by railroad cars bumping each other when being coupled together. These devices are constructed such that they will absorb impact energy directed only along a line coincident with the center line of a railroad car to which it is attached, and includes a ram rod which pushes on and telescopically collapses a tubular member axially of itself, whereby the sidewalls of the tube are progressively flexed or bent radially and then in a reverse axial direction along the length of the tube. This scheme is very well known in the art of drawing a sheet metal blank in the form of a relatively shallow cup of large diameter into a relatively deep shell of greatly reduced diameter in a single operation by a male drawing die moving coaxially in a female forming die with the shallow cup disposed therebetween in an inverted position.

Also used in this field is a system whereby a ram rod which is attached at one of its ends to a railroad car's bumper or sill, pushes against the center of a deep and generally U-shaped strip of metal attached adjacent its open flange end to the car's frame. This configuration has several weaknesses, namely, that the right angle bends at the strip's flange, the anchor bolts thereat, and the right angle bends at its closed end contacted by the ram. It should be understood that in order for this device to absorb any realistic amount of energy during a collision, the strip must have considerable thickness. Thus, it is vulnerable to be damaged by multidimensional stresses developed during a collision. A vital point regarding the mechanical properties of ductile materials seems to have been ignored in this design. Although the presence of sharp corners, holes, or other structural discontinuities in a structural member generally can be ignored under static loading condition, their presence will produce complex multiaxial stresses, which are composed of tensile, compressive, and shear components when this member is under impact load. The net result of these combined stresses during rapid loading is to increase the tensile stress necessary to produce failure. Under such conditions, normally ductile materials can be made to fail in a brittle manner with a substantial reduction in the energy absorbed during failure.

For impact loading, the shape of a member is important for still another reason, since stress reflections occur at discontinuities which may cause the local stress level to be doubled instantaneously. The location and character of stress-wave reflections will determine the location of peak stresses and determine preferred failure locations. Like the previously described device, this system also cannot tolerate impact forces in a direction other than in a direct line along the longitudinal axis of the ramrod and along the center line of the car carrying the device. A force applied to the ram from any other direction will cause the band to rupture at the weak point mentioned above and may bend the ram and cause it to jam, since there is no tolerance for lateral movement provided. The same difficulty had long been observed in the manufacturing industry involving extrusion of metals.

An even more complete treatise of this subject can be found in such references as a book by W. Goldsmith entitled *Impact*, published in 1960 by E. Arnold Ltd., England, at page 322, and the 1964 McGraw-Hill publication, *Mechanical Design and Systems Handbook*, Ch. 16, P. 28, edited by Rothbart.

SUMMARY OF THE INVENTION

In view of the foregoing factors and conditions characteristic of the prior art, it is a primary object of the present invention to provide a new and improved energy absorbing safety bumper.

Another object of the present invention is to provide an energy-absorbing safety bumper advantageously usable with vehicles and guard rails and the like.

Still another object of the present invention is to provide an energy-absorbing safety bumper having easily adjustable and replaceable kinetic energy absorbing elements.

Yet another object of the present invention to provide an energy-absorbing safety bumper utilizing replaceable elongated energy-absorbing elements which absorb kinetic energy only by elongating plastically under a simple uniaxial tension load, the elements being disposed either parallel or orthogonal to the direction of travel of a vehicle housing the safety bumper.

According to the present invention, an energy-absorbing safety bumper is provided which includes a movable mechanism mounted on a stationary frame and having an externally exposed impact portion and an internal portion. The invention also includes energy-absorbing means having at least one replaceable elongated energy-absorbing element operatively coupled at its ends to the internal portion of the movable mechanism for absorbing kinetic energy only be elongating plastically under a simple uniaxial tension load produced by a compressive force incident on the mechanism's impact portion.

The features of the present invention which are believed to be novel are set forth with particularity in the appended claims. The present invention, both as to its organization and manner of operation, together with further objects and advantages thereof, may best be understood by making reference to the following description taken in conjunction with the following drawings in which like reference characters refer to like components in the several views.

BRIEF DESCRIPTION OF THE DRAWINGS

FIG. 5 is a plan view of an energy-absorbing safety bumper constructed in accordance with still another embodiment;

FIG. 6 is an elevational view of the movable mechanism portion of the device of FIG. 5;

FIGS. 7 and 8 are enlarged side and end views, respectively, of the end portion of a compression member and a deformable element of FIG. 5; and FIGS. 9 and 10 are, respectively, schematic representations of parallel and series arrangements of the structure of FIG. 5.

DESCRIPTION OF THE INVENTION

Figure 1:
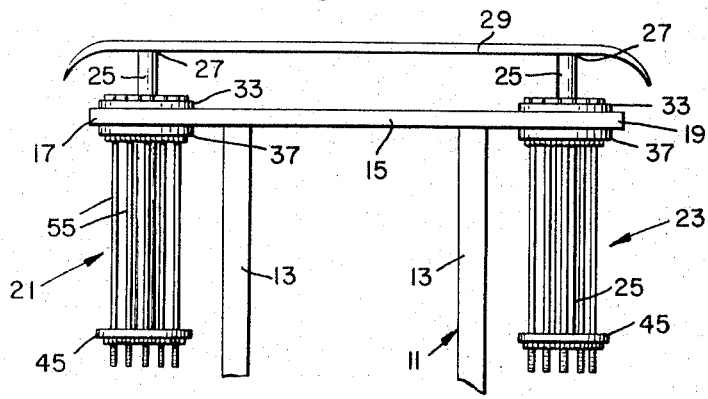
FIG. 1 is a plan view of a vehicle carrying a pair of energy-absorbing safety bumpers constructed in accordance with the present invention.

Referring now to the drawings, and more particularly to FIG. 1, there is shown a vehicle frame structure generally designated 11, having a pair of parallel longitudinal members 13 and a transverse front end member 15. Attached to the transverse end member 15, adjacent opposite ends 17 and 19 thereof, are a pair of similar energy absorbing safety bumper devices 21 and 23, respectively. Each of these devices include an elongated shaft 25 attached by a suitable technique at a first end 27 to a common bumper guard 29, of conventional design.

Figure 2:
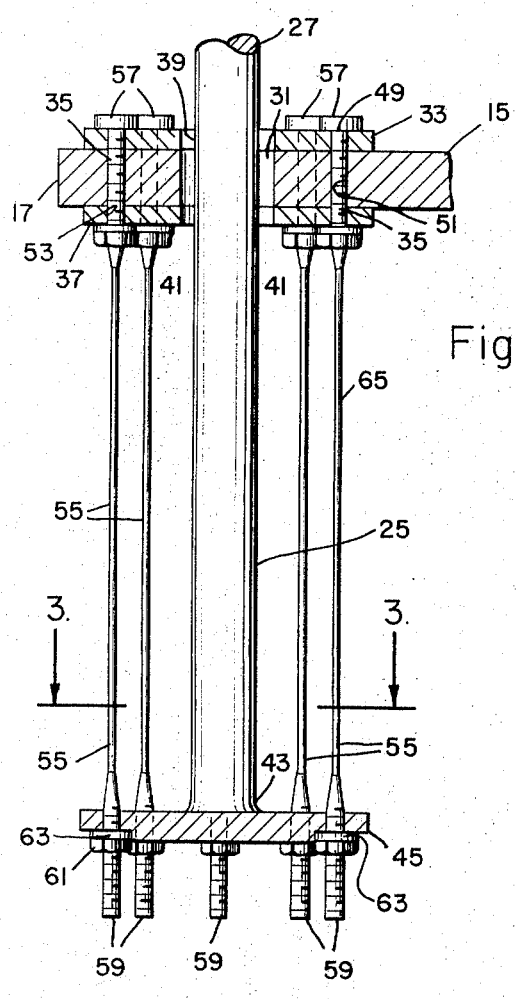
FIG. 2 is an enlarged plan view, in section, of one of the energy-absorbing devices shown in FIG. 1.

The shafts 25 pass through an appropriate aperture 31 in an associated stationary frame member 33, which is attached by any conventional means such as bolts 35 to the front end frame member 15 of the vehicle, using a backing plate 37 for additional strength. As best seen in FIG. 2, coaxial with the aperture 31 are apertures 39 and 41 in the member 33 and the plate 37, respectively, to accommodate the shaft 25. The diameters of these holes are great enough to allow complete freedom of axial movement of the shaft and to allow for the shaft to move without binding, even where a force is applied to its first end 27 at an oblique angle.

Figure 3:
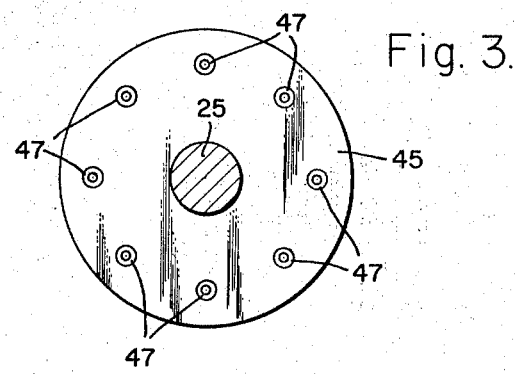
FIG. 3 is an end view of the device of FIG. 2.

At a second end 43 of the shaft 25, a transverse flange 45 is attached by any suitable technique such as welding, for example, and includes in this embodiment eight holes 47 (see FIG. 3). Each of these holes is associated with similar holes 49, 51 and 53 in the stationary frame members 33, the front end member 15 and the backing plate 37, whereby elongated energy-absorbing elements 55 may be supported between the member 33 and the flange 45 and securely held in a position parallel to the shaft 25 by the element's head portions 57 and opposite threaded portions 59 with associated threaded nuts 61 and washers 63.

The energy-absorbing elements 55 are fabricated from a ductile material which is highly erosion resistant, such as, for example, copper, and may be in the form of cylindrical rods, as seen in FIG. 1, or may have a reduced diameter portion 65 as illustrated in FIG. 2. The latter configuration provides the additional advantage of having only simple tension developed when the elements are subjected to rapid loading. Thus, the state of stress within the elements is entirely deterministic and this device becomes even more reliable. Furthermore, there will be instantaneous increase in stress levels near both ends of each of these elements due to the reflection of stress waves during impact. The enlargement at both ends of each element is desirable for a safer balanced design.

The material used to fabricate the shaft 25, the stationary frame 33 and its backing plate 35, and the transverse flange 45 are not critical and any structural material generally considered suitable may be utilized. For example, these members may be made of the same structural steel as the frame of the vehicle itself.

As noted previously, the invention provides a unique means of absorbing kinetic energy for a body during impact so that the body, and its contents and passengers, may not be damaged or injured by the deceleration force produced by such impact. The most significant portion of the invention is the use of one or more energy absorbing elements 55 which deform plastically (stretch) under an impact load.

The invention utilizes the well known properties and characteristics of a ductile material to provide an unusual and advantageous device. For example, the area under the very well known form of a stress-strain diagram for a ductile material represents the ability of this material to absorb energy, or the toughness of the material.

In using this characteristic, it has been noted that a body of mass $m_1$ which moves with the velocity of $v_1$ toward a large stationary body of mass $m_2$, possesses a kinetic energy represented by $$K \cdot E \cdot = 1/2 \, m_1 \, v_1^2,$$

and that if $m_1$ collides suddenly with the mass $m_2$, an impulsive force F of certain magnitude will be developed between these two masses. Of course, the magnitude of this force depends on the mechanical properties of the two masses, $m_1$ and $m_2$, in collision and is the force which causes the damage to the body of concern, $m_1$.

In order to prevent the moving body $m_1$ and its contents from being damaged, the energy absorber herein described divides the magnitude of the force F applied to the first or impact end of the shaft 25 equally in each of its energy-absorbing elements 55, which are stressed plastically. Thus, the principal part of the kinetic energy is controlled by doing mechanical work in the energy-absorber device and is not transmitted to the body carrying it.

During impact, the maximum reaction force that can be developed equals $$\tau_u \, a$$

where $\tau_u$ equals the ultimate strength of the energy absorbing material, and $a$ equals the total cross sectional area of these elements. If the unstretched length of all of the elements 55 is equal to 1, the maximum energy which can be absorbed by the invention is:

$$K \cdot E = a \, 1 \, e_T,$$

where $e_T$ equals the toughness value of the material per unit volume.

The deceleration of the mass $m_1$ under the action of this invention can be calculated from the equation $$\dot{v}_1 = F/m_1 = \tau_u \, a/m_1.$$

Thus, by choosing a proper set of values for the parameters $a$, $1$, $e_T$ and $d$ (the maximum distance the shaft may move inwardly under impact and consequently the maximum elongation of each of the elements 55), the maximumg-load that will be experienced by the body $m_1$ and its duration in the event of a collision may be controlled.

As an example, a 3,220-pound automobile which is travelling at a speed of 20 miles per hour has a kinetic energy expressed by $$K \cdot E = 1/2 \, m \, v^2 = 43,000 \text{ ft-lb.}$$

Where a ductile metal is used which has a toughness value intention of 16,500 in-lb/in$^3$, a volume of $$V = (43,000)(12)/16,500 = 31.3 \text{ in}^3 \text{ of this material is needed to completely absorb its kinetic energy.}$$

Where ⅛ inch diameter elements, each 48 inches long, are available, the total number of such elements needed may be calculated from $$N = V/\pi \, r^2$$

or $$N = 31.3/\pi(1/16)^2 = 28.$$

If the ultimate strength of the material $\tau_u$ (the greatest height under the stress, strain diagram of this material) is 60,000 lb/in$^2$, for example, a maximum reaction force developed during impact can be expressed by $$F_r = \tau_u \, a = (60,000)(0.69) = 4.14 \times 10^4 \text{ lb.}$$

From this, the maximum deceleration of the vehicle may be calculated as:

$$(\dot{V})_{max} = F_r/3,200/32.2 = 414 \text{ ft/sec}^2$$

or 12.9g. This g-load is considered rather safe.

It should be noted that only the energy absorbing elements undergo plastic deformation so as to absorb impact energy while all the other parts of the device do not suffer inelastic deformation when the impact speed is under its designed speed limit.

Another consequence of this controlled deformation is that the duration of impact may be lengthened as the impulsive force is adequately reduced. Thus it can provide sufficient time to activate the vehicle's secondary safety device, such as air bags or their equivalent. It will be noted also that in the preferred embodiment of the invention, the elements 55 are threadably attached to the device and thus may be easily adjusted or tightened after a mild impact. This ensures that the maximum safe elongation of these elements for the next impact can be maintained and their ability to absorb energy is fully utilized. The elements 55 may also be easily replaced after a major collision when they suffered excessive deformation.

Figure 4:
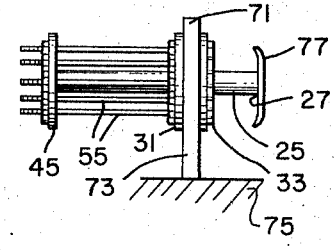
FIG. 4 is an elevational view of another embodiment of the invention used in conjunction with a guard rail.

With respect to FIG. 4, one or more of the safety bumpers described previously may be mounted on a post 71 imbedded at its lower portion 73 in the ground or concrete 75 alongside a roadway, possibly at a curve therein. The movable shaft 25 of the device in this case may carry at least a portion of a guard railing 77 so that a vehicle leaving the roadway will contact the railing 77 to force a deformation or plastic elongation of the device's elements 55 to absorb the impact energy and prevent extensive damage to the vehicle and its passengers, and to the post 71 itself.

Referring now to FIGS. 5 and 6, there is shown an energy-absorbing safety bumper constructed in accordance with still another embodiment of the present invention. Here, a safety bumper 81 is shown to have a stationary frame 83 to which is attached by an angle plate 85, a movable mechanism 87. The mechanism 87 includes compression members 89, 91, 93, and 95 of a relatively high strength metal such as steel, for example, connected by appropriate pivot pins.

The mechanism 87 is basically in the form of the letter M, with three of the previously described elongated energy-absorbing elements 55 adjustably and replaceably attached to the extremities of the compression members. Thus, element 55A and 55B are pivotally connected or anchored by means of pivot blocks 97 (see FIGS. 7 and 8) and their associated pivot pins 99 to the ends 101 and 103 of the outermost compression members 89 and 95, respectively.

The opposite ends of the elements 55A and 55B are anchored to anchor blocks 105 interconnected by an elongated pin 107 through appropriate bearing holes in ends 109 and 111 of respective members 91 and 93, as best viewed in FIG. 6. Similarly, the ends 59 of the energy-absorbing element 55C pass through holes 113 in pivot blocks 97 and anchored there by the nuts 61. The pins 99' of these blocks are longer than the aforementioned blocks 97 so as to extend through appropriate bearing holes in ends 115 and 117 in members 89 and 91 and in ends 119 and 121 in members 93 and 95, respectively.

As illustrated in FIG. 5, the movable mechanism further includes an externally exposed impact portion or bumper 125 with a channel 127 along its inner surface to slidably accomodate movement of the compression member ends 115, 117 and 119, 121 only in the plane of the compression members. In this embodiment, a compressive impact force, as indicated by arrow 131, incident on the bumper's outer impact surface 133, will tend to cause the ends of the compressive elements, pivotally anchored to the element 55C, to move toward the stationary frame 83. In so doing, these ends will tend to move in the channel 127 in an outward direction, orthogonal to the normal direction of vehicle travel and the impact force direction 131, as indicated by arrows 135. This places only a simple uniaxial tension load on the energy-absorbing element 55C. Concurrently, the movement of the bumper 125 toward the stationary frome 83 causes the ends 101 and 103 of the pivotally interconnected outer members 89 and 95 to move in the same outward directions 135. In that the ends of the members 91 and 93 and the inward ends of the elements 55A and 55B are pivotally anchored through the bracket 85 to the stationary frame 83, the movement of the bumper 125 also causes simple uniaxial tension loads on the energy-absorbing elements 55A and 55B. The dashed outlines 141 indicate a relatively easily deformable structure adapted to support the bumper 125 in place.

In this embodiment, it will be seen that the longitudinal axes of the energy-absorbing elements 55 lie orthogonally to the inward impact force direction 131, in contrast to the first described embodiments. This provides a more compact configuration that is easily adapted to be either incorporated in new vehicles or added to existing vehicles. Further, the safety bumper 81 is economical to manufacture, and since the linked triangular movable mechanism 87 is a very sturdy structural shape, a very favorable load carrying-to-weight ratio is achieved.

For additional load carrying protection, two or more safety bumpers 81 may be coupled together either one above the other in a parallel relationship 155, spaced by spacers 157 as illustrated schematically in FIG. 9, or one in front of the other in a series relationship 161 as shown in FIG. 10. When the bumpers are in series, deceleration will be more gentle (less G-load), while the parallel arrangement is useful where frontal space is of concern. It will be again noted that in none of the embodiments of the invention are there present any torsion, bending, or discontinuity stress concentrations in any of the elongated energy-absorbing elements.

From the foregoing, it should be evident that there has been described a very effective and efficient but simple and inexpensive energy-absorbing safety bumper which can be incorporated in new and existing vehicles and in many other impact applications to prevent damage to the bodies and to their contents under impact conditions.

It should also be understood that although several embodiments of the invention have been described in detail, further modifications and embodiments may be made by one skilled in the art, and materials generally considered to be suitable for a particular application may be substituted for the materials herein identified. In other words, the materials named for the various components are not criticle. For example, the shaft 25 and the compression members 87–95 may be steel or a special alloy of steel or aluminum. Also, the pivot pins should be fabricated from a strong metal such as a steel alloy known to those skilled in the art.

What is claimed is:

1. An energy-absorbing safety bumper, comprising:
a stationary frame;
a movable mechanism mounted on said stationary frame and having an externally exposed impact portion and an internal portion; and
energy-absorbing means including at least one replaceable elongated energy-absorbing element having a reduced diameter portion between its ends, said element being operatively coupled at its ends to said internal portion of said movable mechanism for absorbing kinetic energy only by elongating plastically under a simple uniaxial tension load produced by a compressive force incident on said impact portion.

2. An energy-absorbing safety bumper, comprising:
a stationary frame;
a movable mechanism mounted on said stationary frame and having an externally exposed impact portion and an internal portion, said movable mechanism including four pivotally interconnected compression members in a general M-shape configuration; and
energy-absorbing means including three replaceable elongated energy-absorbing elements, one of said energy-absorbing elements being pivotally connected between ends of the compression member configuration to define three adjacent triangles for absorbing kinetic energy only by elongating plastically under a simple uniaxial tension load produced by a compressive force incident on said impact portion, each of said three energy-absorbing elements being parallel to each other and orthogonal generally to the direction of said compressive force incident on said impact portion.

* * * * *